United States Patent
Odate et al.

(10) Patent No.: US 6,844,961 B2
(45) Date of Patent: Jan. 18, 2005

(54) METHOD AND APPARATUS FOR CONTROLLING RAMAN AMPLIFICATION USING EXCITATION LIGHT PULSES OF DIFFERENT WAVELENGTHS

(75) Inventors: Kaori Odate, Kawasaki (JP); Motoyoshi Sekiya, Kawasaki (JP); Ryosuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/103,898

(22) Filed: Mar. 25, 2002

(65) Prior Publication Data

US 2003/0072074 A1 Apr. 17, 2003

(30) Foreign Application Priority Data

Oct. 3, 2001 (JP) ........................................ 2001-307446

(51) Int. Cl.$^7$ ................................................. H01S 3/00
(52) U.S. Cl. ....................................................... 359/334
(58) Field of Search ................................ 359/334, 238; 372/38.06

(56) References Cited

U.S. PATENT DOCUMENTS

| | | | | |
|---|---|---|---|---|
| 5,880,866 | A | * | 3/1999 | Stolen .......................... 398/101 |
| 5,923,683 | A | * | 7/1999 | Morioka et al. ................ 372/6 |
| 6,292,288 | B1 | * | 9/2001 | Akasaka et al. ............. 359/334 |
| 6,417,958 | B1 | * | 7/2002 | Du et al. ..................... 359/334 |
| 6,456,426 | B1 | * | 9/2002 | Bolshtyansky et al. ...... 359/334 |
| 2003/0039438 | A1 | * | 2/2003 | Gertsvolf et al. ............. 385/27 |
| 2003/0081307 | A1 | * | 5/2003 | Fludger et al. .............. 359/334 |

FOREIGN PATENT DOCUMENTS

WO  WO 92/11561  * 7/1992 ............. G02F/1/39

OTHER PUBLICATIONS

Marshall et al. Novel Delayed Pulse Techniques for Stimulated Raman Scattering. IEEE Journal of Quantum Electronics, vol. 29, No. 2, Feb. 1993. pp. 515–524.*
Fludger et al. Novel Ultra–Broadband High Performance Distributed Raman Amplification Employing Pump Modulation. OFC 2002. Mar. 17–22, 2002. pp. 183–184.*
Japanese Abstract No. 2000–314902 A, dated Nov. 14, 2000. Translated.
Japanese Abstract No. 05–288681 A, dated Nov. 2, 1993. Translated.
Japanese Abstract No. 60–066494 A, dated Apr. 16, 1985. Translated.

* cited by examiner

*Primary Examiner*—Mark Hellner
*Assistant Examiner*—Deandra M. Hughes
(74) *Attorney, Agent, or Firm*—Staas & Halsey LLP

(57) ABSTRACT

In an Raman amplification control apparatus, a plurality of excitation light pulses respectively having a plurality of different wavelengths are generated; and the plurality of excitation light pulses are injected into a predetermined optical transmission line in turn at such timings that the plurality of excitation light pulses do not overlap even after propagation of a predetermined effective length of the predetermined optical transmission line. In addition, the plurality of excitation light pulses may be injected into the predetermined optical transmission line in such an order that the difference between propagation velocities (or wavelengths) of each pair of ones of the plurality of excitation light pulses successively injected into the predetermined optical transmission line is minimized.

19 Claims, 14 Drawing Sheets

| WAVELENGTH CHANNEL | ORDER OF ABSOLUTE VALUE OF DIFFERENCE FROM ZERO-DISPERSION WAVELENGTH | ORDER OF MAGNITUDE OF DISPERSION | ORDER OF INJECTION INTO OPTICAL FIBER (2 WAYS) | |
|---|---|---|---|---|
| $\lambda_{i-1}$ | 3 | 3 | 3 | 4 |
| $\lambda_i$ | 4 | 4 | 4 | 3 |
| $\lambda_{i+1}$ | 5 | 5 | 5 | 2 |
| $\lambda_{j-1}$ | 6 | 6 | 6 | 1 |
| $\lambda_j$ | 2 | 2 | 2 | 5 |
| $\lambda_{j+1}$ | 1 | 1 | 1 | 6 |

METHOD AND APPARATUS FOR CONTROLLING RAMAN AMPLIFICATION USING EXCITATION LIGHT PULSES OF DIFFERENT WAVELENGTHS

BACKGROUND OF THE INVENTION

1) Field of the Invention

The present invention relates to a method and an apparatus for controlling Raman amplification of optical signals.

2) Description of the Related Art

Recently, distributed-parameter-type optical fiber amplification called Raman amplification is receiving attention in the field of optical communications. In the Raman amplification, a physical phenomenon in which vibrations of materials inelastically scatter incident light so as to produce Raman scattered light having a wavelength which is different from the wavelength of the incident light is utilized, and strong excitation light is injected into an optical-fiber transmission line so that optical amplification occurs in the entire optical-fiber transmission line.

The gain of the Raman amplification has a peak at a wavelength which is about 100 nm longer than the wavelength of incident excitation light. That is, the Raman amplification of optical signals having a wavelength about 100 nm longer than the wavelength of the incident excitation light is most efficient. For example, in order to amplify an optical signal having a wavelength of 1.55 micrometers, excitation light having a wavelength of 1.45 micrometers is injected into the optical-fiber transmission line.

When repeaters are arranged to realize the Raman amplification, a longer optical fiber cable can be laid, and intervals between repeaters can be increased. Thus, the Raman amplification is very beneficial to high-speed, large-capacity optical transmission.

In addition, with the recent increase in the transmission rate corresponding to the rapid development of the Internet, use of WDM (Wavelength Division Multiplex) transmission is rapidly spreading. In the WDM transmission, a plurality of optical signals having a plurality of different wavelengths is concurrently transmitted through a single optical fiber by multiplexing the plurality of optical signals.

When the Raman amplification is used in WDM transmission systems, the width of a gain band which can be realized by exciting an optical fiber with incident excitation light having a single wavelength becomes smaller than the widths of the bandwidths used in the current WDM systems. Therefore, normally, the width of the gain band is expanded by providing a plurality of excitation light sources and exciting the optical fiber with a plurality of excitation wavelengths (e.g., six to eight excitation wavelengths) of excitation light. For example, in order to amplify broadband signal light in broadband WDM systems, Raman amplification is performed by using excitation light having a plurality of wavelengths.

However, in the conventional WDM systems, the Raman amplification is performed by concurrently injecting a plurality of wavelengths of continuous excitation light emitted from a plurality of excitation light sources. Therefore, the excitation light is strongly affected by nonlinear optical phenomenons which are specific to excitation with a plurality of wavelengths of excitation light, such as the stimulated Raman scattering (SRS) and the four wave mixing (FWM), as explained below.

In general, the SRS is a phenomenon in which energy is exchanged through optical, lattice vibration in an optical fiber between a plurality of wavelengths of light propagated through the optical fiber. In the SRS, light having a longer wavelength is Raman amplified with light having a shorter wavelength. For example, the Raman amplification utilizes the SRS for amplification of signal light.

When the SRS occurs between different wavelengths of light, a portion of energy of light having a shorter wavelength (i.e., higher photon energy) is transferred to light having a longer wavelength (i.e., lower photon energy). Therefore, when a plurality of different wavelengths of light pass through an optical fiber, the powers of the plurality of different wavelengths of light become different at the output end of the optical fiber even when the powers of the plurality of different wavelengths of light are initially identical at the input end of the optical fiber. For example, the power spectrum of the light at the output end of the optical fiber exhibits a tilt as illustrated in FIG. 1.

The amount T(dB) of the tilt can be expressed as $$T = \left| 10 \log 10 \frac{1 + N(N-1)P\Delta f \gamma_p L_{\it eff} / A_{\it eff} / 6 \times 10^{13}}{1 - N(N-1)P\Delta f \gamma_p L_{\it eff} / A_{\it eff} / 6 \times 10^{13}} \right|, \quad (1)$$

where N is the number of channels, P is the amount of input power, $\Delta f$ is the channel spacing, $L_{\it eff}$ is the effective length of the optical fiber, $\gamma_p$ is the peak gain coefficient, and $A_{\it eff}$ is the effective cross-sectional area of the fiber core.

FIG. 1 is a graph indicating simulated values of line reception levels of light having various wavelengths at input and output ends of an optical fiber. In FIG. 1, the abscissa indicates the wavelength(nm), and the ordinate indicates the line reception level(dBm). In the example of FIG. 1, simulated values of line reception levels of light having six wavelengths of 1,430, 1,435, 1,455, 1,460, 1,480, and 1,485 nm at input and output ends of an optical fiber are indicated. That is, the minimum wavelength is 1,430 nm, and the maximum wavelength is 1,485 nm.

As illustrated in FIG. 1, the simulated values of line reception levels of light at the output end of the optical fiber exhibit a tilt of about 0.12 dBm, while the simulated values of line reception levels of light at the input end of the optical fiber do not exhibit a tilt.

As mentioned before, in the conventional WDM systems, the Raman amplification is performed by concurrently injecting into an optical fiber transmission line a plurality of wavelengths of continuous excitation light emitted from a plurality of excitation light sources. Therefore, the SRS also occurs between different wavelengths of excitation light. In this case, a portion of power of excitation light having a shorter wavelength is used for Raman amplifying excitation light having a longer wavelength, and thus power of a channel which is Raman amplified with the excitation light having the shorter wavelength. Thus, the powers of signal light in the respective channels become different, and the efficiency in utilization of the excitation light having a shorter wavelength is lowered.

On the other hand, the FWM is a phenomenon in which new frequencies w3 and w4 of light are generated through cubic nonlinear polarization caused by injection of two frequencies w1 and w2 of light. That is, in the FWM, new interference light is generated in an optical fiber by interference between a plurality of different wavelengths of light propagating through the optical fiber.

When a material is irradiated with light, electrons in atoms or molecules are displaced by electric fields of the light, i.e., polarization occurs. When a material is irradiated with strong laser light, the material exhibits a nonlinear behavior, i.e., second-order or third-order nonlinear polarization occurs, where the second-order or third-order nonlinear polarization is proportional to squares or cubes of electric fields of the light.

The FWM is most enhanced when an input wavelength coincides with the zero-dispersion wavelength of the optical fiber. Usually, the wavelengths of excitation light used in Raman amplifiers are in the 1,400 nm range. Therefore, when an optical fiber has a zero-dispersion wavelength in the 1,400 nm range, crosstalk caused by the four wave mixing between different wavelengths of light increases. When crosstalk increases, transmission quality deteriorates. In addition, since a portion of the excitation power is used for producing the interference light, the excitation efficiency is reduced. The amount $P_{FWM}$ of crosstalk can be expressed by the formula (2d), where $\Delta\beta$ is expressed by the formula (2a), K is expressed by the formula (2b), and $\eta_{ijk}$ is expressed by the formula (2c).

$$\Delta\beta = \beta_{ijk} + \beta_k - \beta_i - \beta_j \quad (2a)$$

$$= \left(\frac{\pi\lambda^4}{3c^2}\right)\left(\frac{dDc}{d\lambda}\right)\{(f_{ijk} - f_0)^2 - (f_i - f_0)^2 - (f_j - f_0)^2 + (f_k - f_0)^2\}$$

$$K = 32\pi^2(L_{eff}/A_{eff})/(n^2\lambda) \quad (2b)$$

$$\eta_{ijk} = \left(\frac{\alpha^2}{\alpha^2 + \Delta\beta^2}\right)\left(1 + \frac{4\exp(-\alpha L)\sin^2(\Delta\beta L/2)}{\{1 - \exp(-\alpha L)\}^2}\right) \quad (2c)$$

$$P_{FWM} = P_{ijk} = \eta_{ijk}K^2(D_\chi)(P_i(0)P_j(0)P_k(0)\exp(-\alpha L) \quad (2d)$$

In the formulas (2a), (2b), (2c), and (2d), $n_0$ is the refractive index of a fiber core, $\lambda$ is the wavelength, c is the velocity of light, D is the degeneracy factor, $\alpha$ is the fiber attenuation coefficient, $\beta$ is the propagation constant, $\chi$ is the third-order nonlinear susceptibility, $A_{eff}$ is the effective cross-sectional area of the fiber core, L is the fiber length, $L_{eff}$ is the effective length of the optical fiber (i.e., $L_{eff}=(1-\exp(-\alpha L))/\alpha$), $f_0$ is the frequency corresponding to the zero-dispersion wavelength, $D_c$ is the fiber chromatic dispersion, $f_i$, $f_j$, and $f_k$ are frequencies of excitation light and signal light, $P_i(0)$, $P_j(0)$, and $P_k(0)$ are input powers of the frequencies $f_i$, $f_j$, and $f_k$ of excitation light and signal light, and $f_{ijk}$ is a frequency of newly generated light.

FIGS. 2(A) and 2(B) are graphs indicating simulated values of crosstalk at various frequencies in the first case where the FWM does not occur and in the second case where the FWM occurs. In each of FIGS. 2(A) and 2(B), the abscissa indicates the wavelength(nm), and the ordinate indicates the amount of crosstalk(dB). In the example of FIG. 2(A), simulated values of the crosstalk of light at eight frequencies ranging from the minimum frequency of 1,420 nm at the intervals of 10 nm are indicated, and the zero-dispersion wavelength of the optical fiber is 1,451.9 nm.

The amounts of crosstalk in the first case where the FWM does not occur are in the range between −40 and −38 dB as illustrated in FIG. 2(A), and the amounts of crosstalk in the second case where the FWM occurs are in the range between −13.5 and −11 dB as illustrated in FIG. 2(B). That is, the amounts of crosstalk are increased by the FWM.

As explained above, since a plurality of wavelengths of continuous excitation light emitted from a plurality of excitation light sources is concurrently injected in an optical fiber in the conventional Raman amplified WDM systems, optical transmission is affected by nonlinear optical phenomenons including the SRS and the FWM.

That is, the SRS occurs between a plurality of different wavelengths of excitation light, and therefore differences arise between the powers of the plurality of different wavelengths of excitation light. Thus, differences also arise between the powers of a plurality of wavelengths of signal light which are respectively excited with the plurality of different wavelengths of excitation light.

According to a conventional technique, initial power differences are provided to the plurality of different wavelengths of excitation light so as to cancel the differences caused by the SRS, i.e., initial power differences realizing an inverse profile to the profile of the line reception levels at the output end of the optical fiber as illustrated in FIG. 1 are provided to the plurality of different wavelengths of excitation light when the plurality of different wavelengths of excitation light is injected into the optical fiber. However, it is impossible to quantitatively determine and set the above initial power differences for each system. Even when the above initial power differences can be provided, the excitation light is not efficiency utilized.

In addition, since the FWM occurs in the conventional Raman amplified WDM systems, the amount of crosstalk increases, and a portion of the excitation power is used for producing the interference light. Therefore, the transmission quality deteriorates.

As explained above, in the conventional Raman amplified WDM system, a plurality of wavelengths of continuous excitation light is concurrently injected into an optical transmission line, and therefore the SRS and the FWM are caused by the plurality of wavelengths of excitation light. Thus, the efficiency in Reman amplification is reduced, and transmission quality deteriorates.

SUMMARY OF THE INVENTION

An object of the present invention is to provide an apparatus for controlling Raman excitation which realizes Raman amplification of optical signals, in which nonlinear optical phenomenons caused by interaction between a plurality of wavelengths of excitation light are suppressed so that efficient Raman amplification is realized and transmission quality is improved.

Another object of the present invention is to provide a method for controlling Raman excitation which realizes Raman amplification of optical signals, in which nonlinear optical phenomenons caused by interaction between a plurality of wavelengths of excitation light are suppressed so that efficient Raman amplification is realized and transmission quality is improved.

(1) According to the first aspect of the present invention, there is provided a Raman amplification control apparatus comprising: a pulsed excitation light generation unit which generates a plurality of excitation light pulses respectively having a plurality of different wavelengths; and an injection unit which injects the plurality of excitation light pulses into an optical transmission line.

(2) According to the second aspect of the present invention, there is provided a Raman amplification control apparatus comprising: a pulsed excitation light generation unit which generates a plurality of excitation light pulses respectively having a plurality of different wavelengths; and an excitation control unit which controls output of the plurality of excitation light pulses from the Raman amplification control apparatus so that the plurality of excitation light pulses is output from the Raman amplification control apparatus in turn at such timings that the plurality of excitation light pulses do not overlap even after propagation of a predetermined effective length of predetermined optical transmission line.

When the Raman amplification control apparatuses according to the first and second aspects of the present invention are used for exciting the predetermined optical transmission line and Raman amplifying signal light, non-linear optical phenomenons caused by interaction between a plurality of wavelengths of excitation light are suppressed, so that efficient Raman amplification is realized, and the quality of Raman amplified WDM transmission is improved.

The Raman amplification control apparatus according to the second aspect of the present invention may have one or any possible combination of the following additional features (i) to (xi).

(i) The excitation control unit may control the output of the plurality of excitation light pulses from the Raman amplification control apparatus in such an order that a difference between propagation velocities of each pair of ones of the plurality of excitation light pulses successively output from the Raman amplification control apparatus is minimized.

(ii) The excitation control unit may control the output of the plurality of excitation light pulses from the Raman amplification control apparatus in such an order that a difference between wavelengths of each pair of ones of the plurality of excitation light pulses successively output from the Raman amplification control apparatus is minimized.

(iii) In the Raman amplification control apparatus according to the second aspect of the present invention having the additional feature (ii), the excitation control unit may control the output of the plurality of excitation light pulses from the Raman amplification control apparatus in alternately increasing and decreasing order of wavelength.

(iv) In the Raman amplification control apparatus according to the second aspect of the present invention having the additional feature (ii), the excitation control unit may obtain an absolute value of a difference between a zero-dispersion wavelength of the predetermined optical transmission line and each of the plurality of different wavelengths, and control the output of the plurality of excitation light pulses from the Raman amplification control apparatus in alternately increasing and decreasing order of the absolute value.

(v) The excitation control unit may control the output of the plurality of excitation light pulses from the Raman amplification control apparatus so that each pair of ones of the plurality of excitation light pulses successively output from the Raman amplification control apparatus is spaced with an interval which is equal to or greater than a product of the effective length, a difference between wavelengths of the ones of the plurality of excitation light pulses, and a dispersion coefficient at one of the wavelengths of the ones of the plurality of excitation light pulses.

(vi) The excitation control unit may comprise: a pulse light source which generates the plurality of excitation light pulses; a delay unit which delays the plurality of excitation light pulses generated by the pulse light source so that the plurality of excitation light pulse is spaced with constant time intervals; a switch which allows passage of the plurality of excitation light pulses in turn under control of a switch control unit after the plurality of excitation light pulses is delayed by the delay unit; and the switch control unit which controls the switch so that the switch allows passage of the plurality of excitation light pulses in such an order that the plurality of excitation light pulses does not overlap even after the propagation of the predetermined effective length of the predetermined optical transmission line.

(vii) In the Raman amplification control apparatus according to the second aspect of the present invention having the additional feature (vi), the excitation control unit may further comprise an optical coupler which optically couples the plurality of excitation light pulses output from the switch, to the predetermined optical transmission line so that the plurality of excitation light pulses are injected into the predetermined optical transmission line.

(viii) The excitation control unit may comprise: a light source unit which emits the plurality of excitation light pulses in response to a plurality of driving signals, respectively; a timing control unit which outputs a plurality of clock pulses respectively corresponding to the plurality of excitation light pulses, at regular time intervals; a driving unit which outputs the plurality of driving signals in response to the plurality of clock pulses, respectively; and a first optical coupler which optically multiplexes the plurality of excitation light pulses emitted from the light source unit.

(ix) In the Raman amplification control apparatus according to the second aspect of the present invention having the additional feature (viii), the excitation control unit may further comprise a second optical coupler which optically couples the plurality of excitation light pulses output from the first optical coupler, to the predetermined optical transmission lines a so that the plurality of excitation light pulses is injected into the predetermined optical transmission line.

(x) The excitation control unit may comprise: a white light source which emits white light; a wavelength-variable filter which allows passage of only a variable portion of the white light having a variable transparent wavelength; and a wavelength control unit which controls the wavelength-variable filter so that the variable portion of the white light is varied in such a manner that the plurality of excitation light pulses is output from the wavelength-variable filter in turn.

(xi) In the Raman amplification control apparatus according to the second aspect of the present invention having the additional feature (x), the excitation control unit may further comprise an optical coupler which optically couples the plurality of excitation light pulses output from the wavelength-variable filter, to the predetermined optical transmission line so that the plurality of excitation light pulses is injected into the predetermined optical transmission line.

(3) According to the third aspect of the present invention, there is provided a Raman amplified optical transmission system comprising: an optical transmission line; and an excitation control unit which is coupled to the optical transmission line, and injects into the optical transmission line a plurality of excitation light pulses having a plurality of different wavelengths.

(4) According to the fourth aspect of the present invention, there is provided a method for controlling Raman amplification, comprising the steps of: (a) generating a plurality of excitation light pulses respectively having a plurality of different wavelengths; and (b) injecting the plurality of excitation light pulses into a predetermined optical transmission line in turn.

(5) According to the fifth aspect of the present invention, there is provided a method for controlling Raman amplification, comprising the steps of: (a) generating a plurality of excitation light pulses respectively having a plurality of different wavelengths; and (b) injecting the plurality of excitation light pulses into a predetermined optical transmission line in turn at such timings that the plurality of excitation light pulses do not overlap even after propagation of a predetermined effective length of the predetermined optical transmission line.

When the methods according to the fourth and fifth aspects of the present invention are used for exciting the predetermined optical transmission line and Raman amplifying signal light, nonlinear optical phenomenons caused by interaction between a plurality of wavelengths of excitation light are suppressed, so that efficient Raman amplification is realized, and the quality of Raman amplified WDM transmission is improved.

The method according to the fifth aspect of the present invention may have one or any possible combination of the following additional features (xii) to (xvi).

(xii) In step (b), the plurality of excitation light pulses may be injected into the predetermined optical transmission line in such an order that a difference between propagation velocities of each pair of ones of the plurality of excitation light pulses successively injected into the predetermined optical transmission line is minimized.

(xiii) In step (b), the plurality of excitation light pulses may be injected into the predetermined optical transmission line in such an order that a difference between wavelengths of each pair of ones of the plurality of excitation light pulses successively injected into the predetermined optical transmission line is minimized.

(xiv) In the method according to the fifth aspect of the present invention having the additional feature (xiii), in step (b), the plurality of excitation light pulses may be injected into the predetermined optical transmission line in alternately increasing and decreasing order of wavelength.

(xv) The method according to the fifth aspect of the present invention having the additional feature (xiii) may further comprise a step of obtaining an absolute value of a difference between a zero-dispersion wavelength of the predetermined optical transmission line and each of the plurality of different wavelengths, and in step (b), the plurality of excitation light pulses may be injected into the predetermined optical transmission line in alternately increasing and decreasing order of the absolute value.

(xvi) In step (b), the plurality of excitation light pulses may be injected into the predetermined optical transmission line at such timings that each pair of ones of the plurality of excitation light pulses successively injected into the predetermined optical transmission line are spaced with an interval which is equal to or greater than a product of the effective length, a difference between wavelengths of the ones of the plurality of excitation light pulses, and a dispersion coefficient at one of the wavelengths of the ones of the plurality of excitation light pulses.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 14 shows a table indicating the orders of injection of the excitation light pulses.

DESCRIPTION OF THE PREFERRED EMBODIMENTS

Embodiments of the present invention are explained in detail below with reference to the drawings.

(1) Basic Construction

Figure 1:
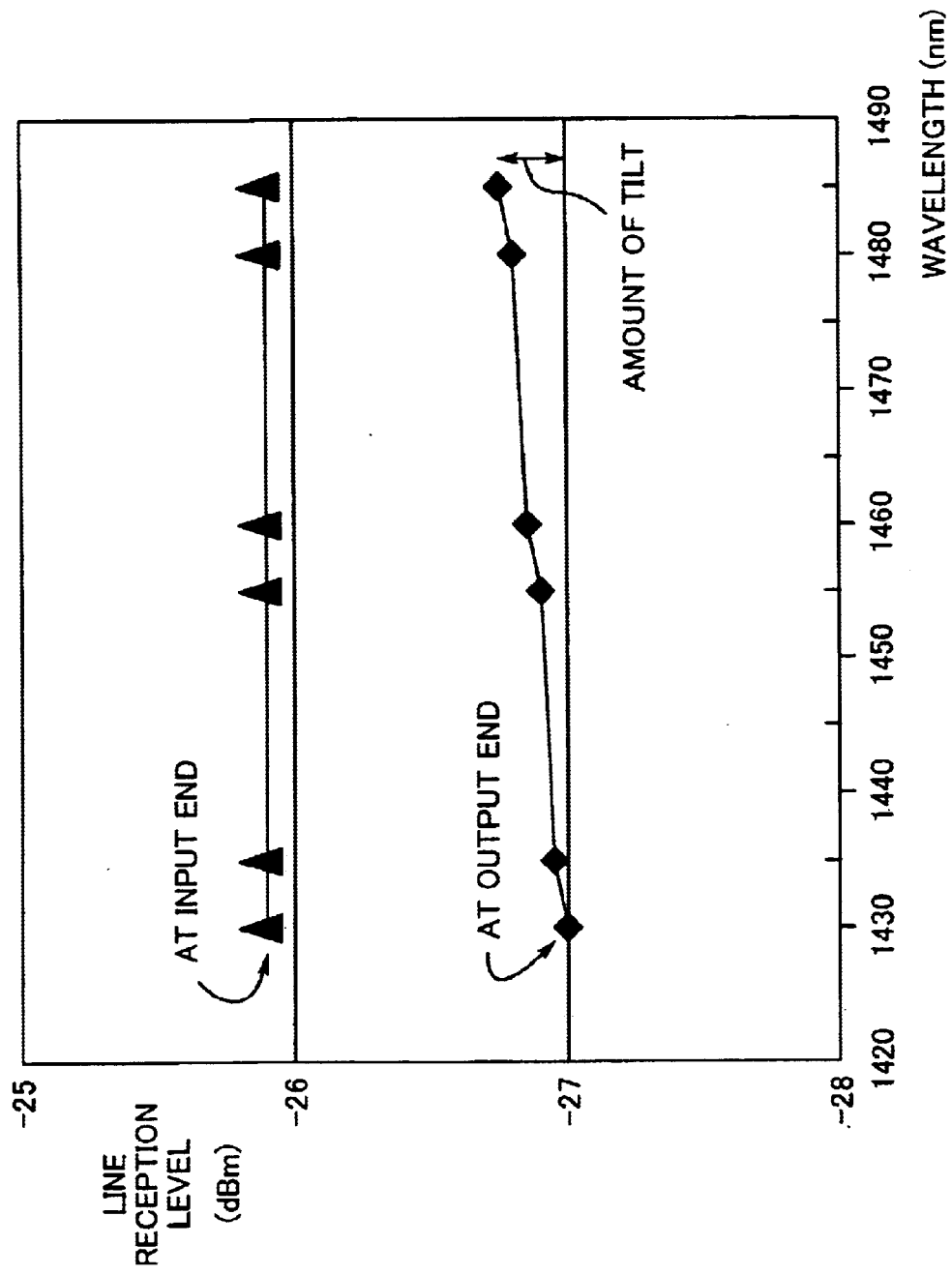
FIG. 1 is a graph indicating simulated values of line reception levels of light having various wavelengths at input and output ends of an optical fiber.
Figure 2A:
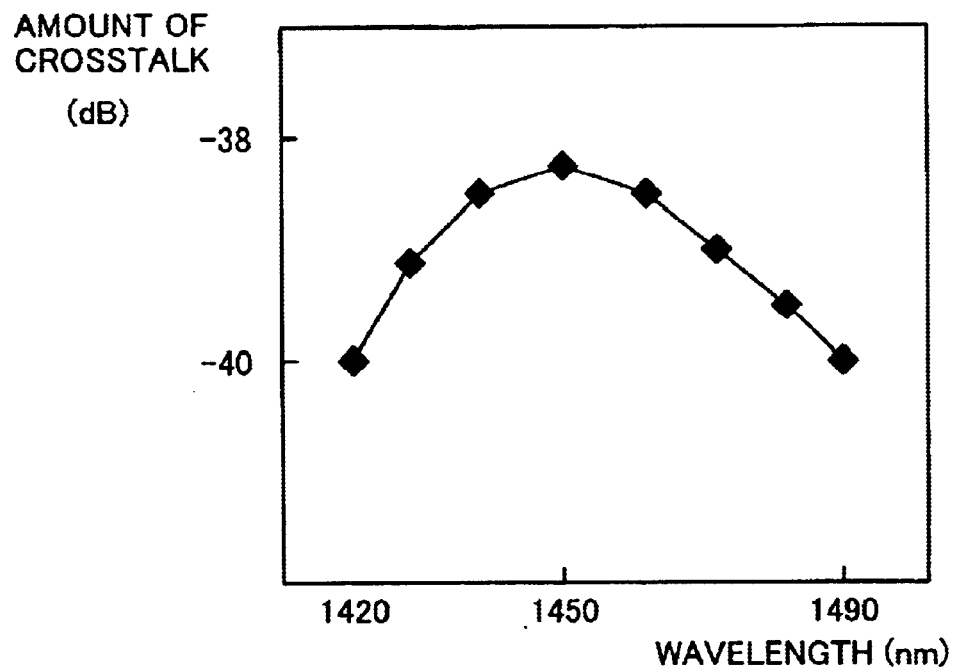
FIGS. 2(A) and 2(B) are graphs indicating simulated values of crosstalk at various frequencies in the first case where the FWM does not occur and in the second case where the FWM occurs.
Figure 2B:
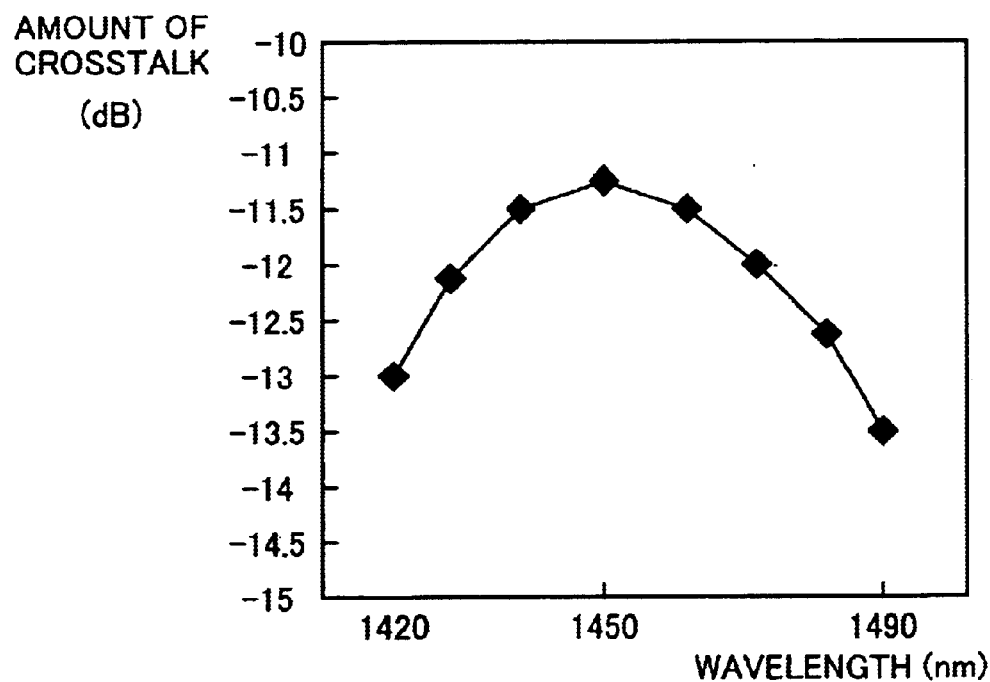
Figure 3:
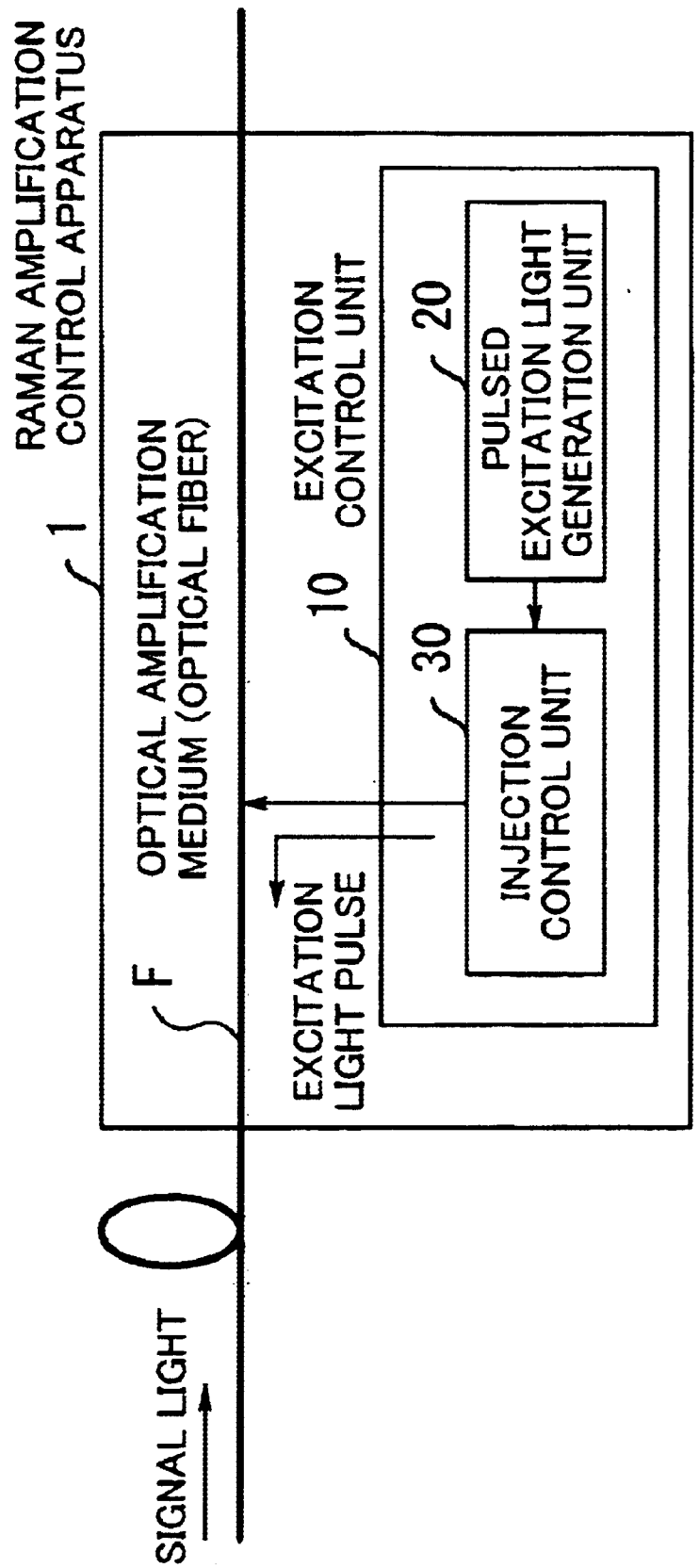
FIG. 3 is a diagram illustrating a construction of a Raman amplification control apparatus according to the present invention.

FIG. 3 is a diagram illustrating a basic construction of a Raman amplification control apparatus according to the present invention. The Raman amplification control apparatus 1 of FIG. 3 is an apparatus for controlling Raman excitation which realizes Raman amplification of optical signals transmitted through an optical amplification medium, and is coupled to the optical amplification medium. The optical amplification medium is, for example, an optical fiber transmission line F as illustrated in FIG. 3. In addition, the Raman amplification control apparatus according to the present invention can be provided in an optical transmission apparatus or in an optical repeater.

The Raman amplification control apparatus 1 of FIG. 3 comprises an excitation control unit 10 including a pulsed excitation light generation unit 20 and an injection control unit 30.

The pulsed excitation light generation unit 20 generates a plurality of excitation light pulses which has a plurality of different wavelengths $\lambda_1, \lambda_2, \ldots \lambda_n$, respectively, and are necessary for realizing Raman amplification in the optical fiber transmission lint F. The injection control unit 30 injects the plurality of excitation light pulses having the plurality of different wavelengths $\lambda_1, \lambda_2, \ldots \lambda_n$ turn into the optical fiber transmission line F so that more than one wavelength of excitation light does not concurrently exist at any location in the optical fiber transmission line F.

Since more than one wavelength of excitation light does not concurrently exist at any location in the optical fiber transmission line F, occurrence of interaction between different wavelengths of excitation light such as the SRS and FWM can be prevented. Therefore, it is possible to increase efficiency in Raman amplification and improve quality of optical transmission.

Figure 4:
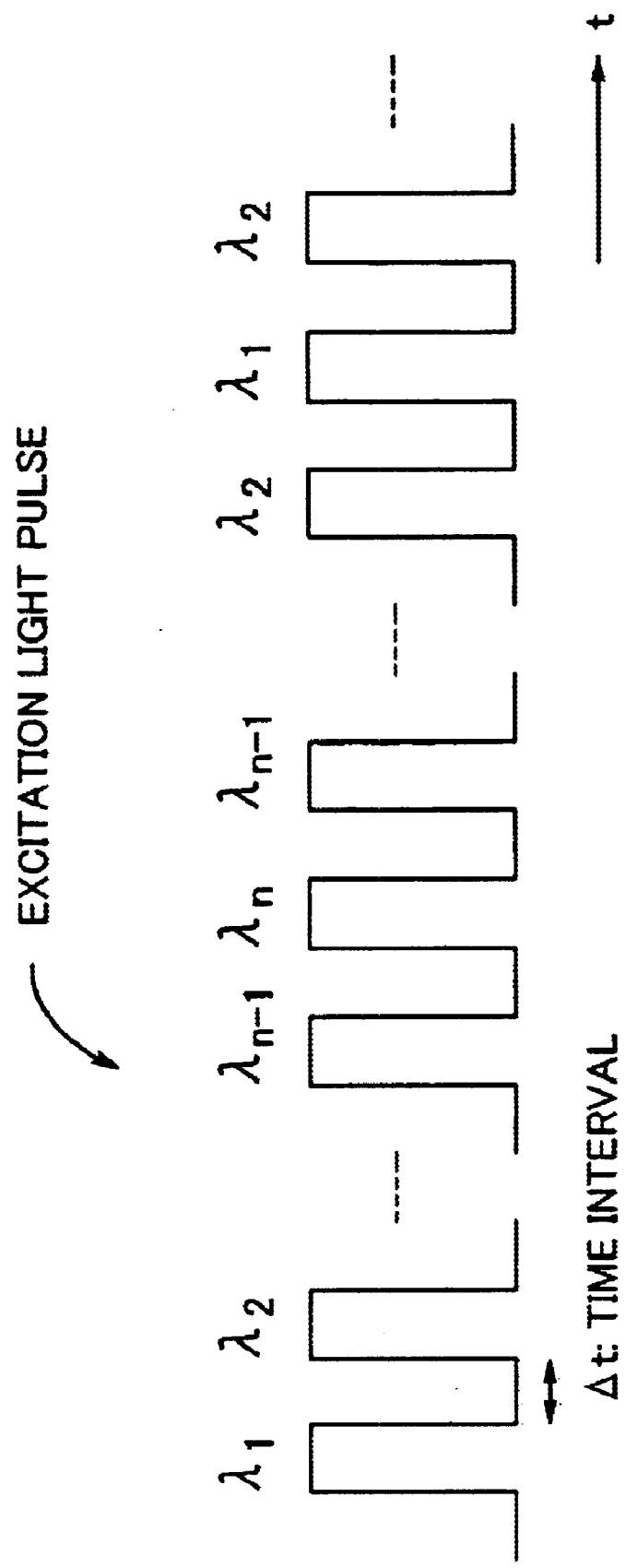
FIG. 4 is a diagram illustrating timings of excitation light pulses having a plurality of wavelengths $\lambda_1, \lambda_2, \ldots, \lambda_n$.

Preferably, the order of the plurality of excitation light pulses injected into the optical fiber transmission line F is determined so that the difference in the wavelength between each pair of excitation light pulses successively injected into the optical fiber transmission line F is minimized. For example, as illustrated in FIG. 4, the plurality of excitation light pulses having the n wavelengths $\lambda_1, \lambda_2, \ldots \lambda_n$ is injected into the optical fiber transmission line F in the order from the shortest wavelength $\lambda_1$ to the longest wavelength $\lambda_n$ in the first cycle, and in the order from the second longest wavelength $\lambda_{n-1}$ to the shortest wavelength $\lambda_1$ in the second cycle. That is, the plurality of excitation light pulses having the n wavelengths $\lambda_1, \lambda_2, \ldots \lambda_n$ is injected into the optical fiber transmission line F in the wavelength order, $\lambda_1, \lambda_2, \ldots \lambda_n, \lambda_{n-1} \ldots \lambda_2, \lambda_1, \lambda_2 \ldots$.

When the plurality of excitation light pulses having the n wavelengths $\lambda_1, \lambda_2, \ldots \lambda_n$ is injected into the optical fiber transmission line F in the above manner, the occurrence of the SRS between different wavelengths of excitation light can be effectively prevented, and the operations of selection and injection of the plurality of excitation light pulses becomes easy.

In addition, in order to avoid concurrent existence of more than one wavelength of excitation light at every location in the optical fiber transmission line F, each pair of excitation light pulses successively injected into the optical fiber transmission line F is spaced with a time interval $\Delta t$.

For example, the above plurality of excitation light pulses is injected into the optical fiber transmission line F so that backward Raman amplification is realized.

(2) Time Intervals Between Pulses

The determination of the above time interval $\Delta t$ is explained below.

The above time interval $\Delta t$ should be determined in consideration of wavelength dispersion of each excitation light pulse so as to prevent interaction between the excitation light pulses. Since the refractive index of a material (quartz) of an optical fiber is different depending on the wavelength of light which propagates through the optical fiber, the propagation velocity of the light which propagates through the optical fiber becomes different depending on the wavelength of the light. The delay caused by the wavelength dispersion can be expressed by using a dispersion coefficient $D$(ps/nm/km).

Figure 5:
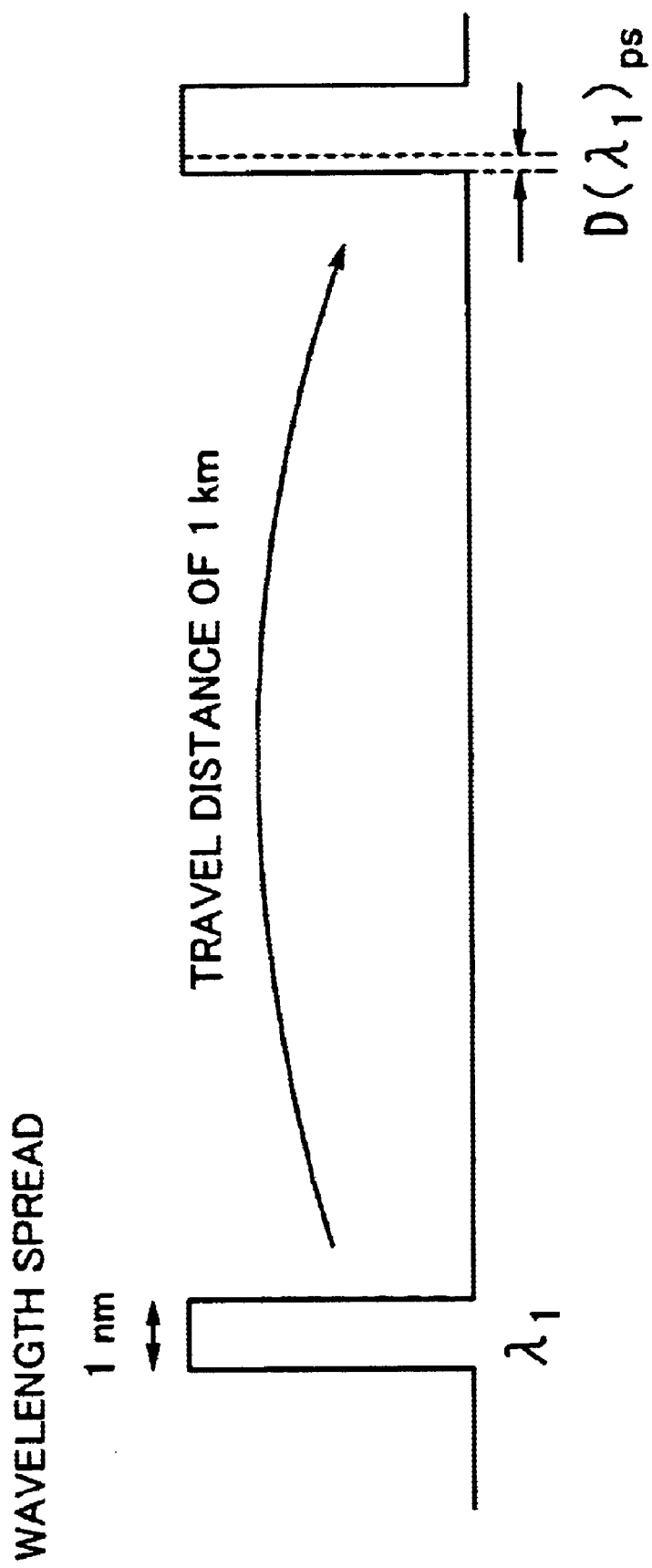
FIG. 5 is an explanatory diagram illustrating broadening of a pulse which is caused by wavelength dispersion after propagation of the pulse through a unit length of optical fiber.

FIG. 5 is an explanatory diagram illustrating broadening of a pulse which is caused by wavelength dispersion after propagation of the pulse through a unit length of optical fiber. When a light pulse having a center wavelength $\lambda_1$ and a wavelength spread of 1 nm travels a distance of 1 km of optical fiber, the pulse width is broadened by $D(\lambda_1)$ ps, where $D(\lambda_1)$ is the value of the dispersion coefficient of the optical fiber at the wavelength $\lambda_1$. That is, the pulse width is broadened by $D(\lambda_1)$ ps due to the wavelength spread of 1 nm.

Figure 6:
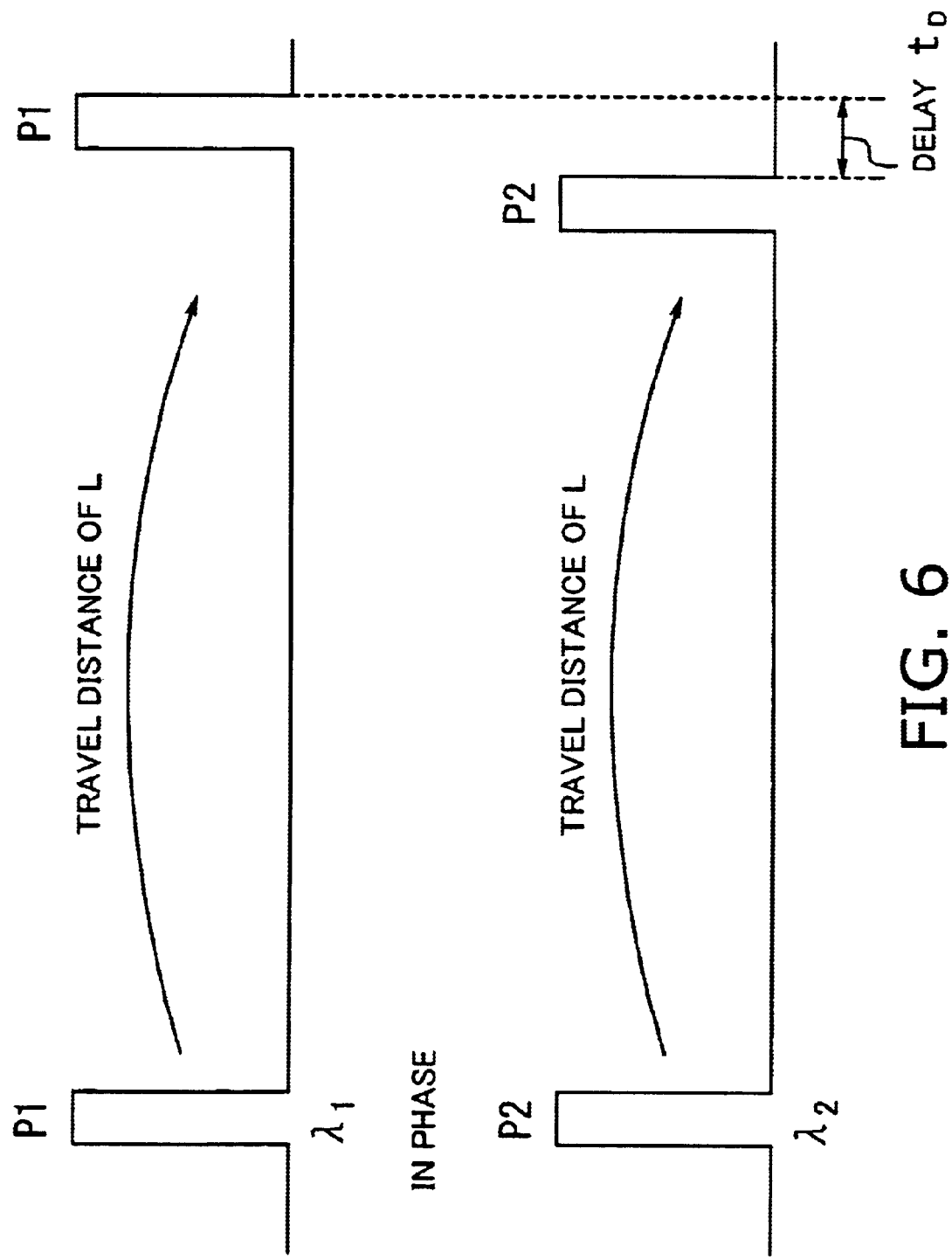
FIG. 6 is an explanatory diagram illustrating a delay produced between light pulses having different wavelengths after the light pulses propagate through an identical length of optical fiber.

FIG. 6 is an explanatory diagram illustrating a delay produced between light pulses having different wavelengths after the light pulses travel a distance of an identical length of optical fiber.

As illustrated in FIG. 6, a light pulse P2 having a center wavelength $\lambda_2$(nm) is delayed by $t_D$ (ps) from a light pulse P1 having a center wavelength $\lambda_1$ ($\lambda_2 < \lambda_1$) and being initially in phase with the light pulse P2 when the light pulses P1 and P2 travel a distance of L(km) of optical fiber. When the wavelengths $\lambda_1$ and $\lambda_2$ are near each other, $D(\lambda_1) \approx D(\lambda_2)$. Therefore, the delay between the light pulses P1 and P2 can be expressed by the following equation (3).

$$t_D = D(\lambda_1) \cdot (\lambda_1 - \lambda_2) \cdot L \tag{3}$$

That is, a delay of $t_D$ is produced between the light pulses P1 and P2 having the different center wavelengths $\lambda_1$ and $\lambda_2$ after the light pulses P1 and P2 travel a distance of L(km) of optical fiber.

Figure 7:
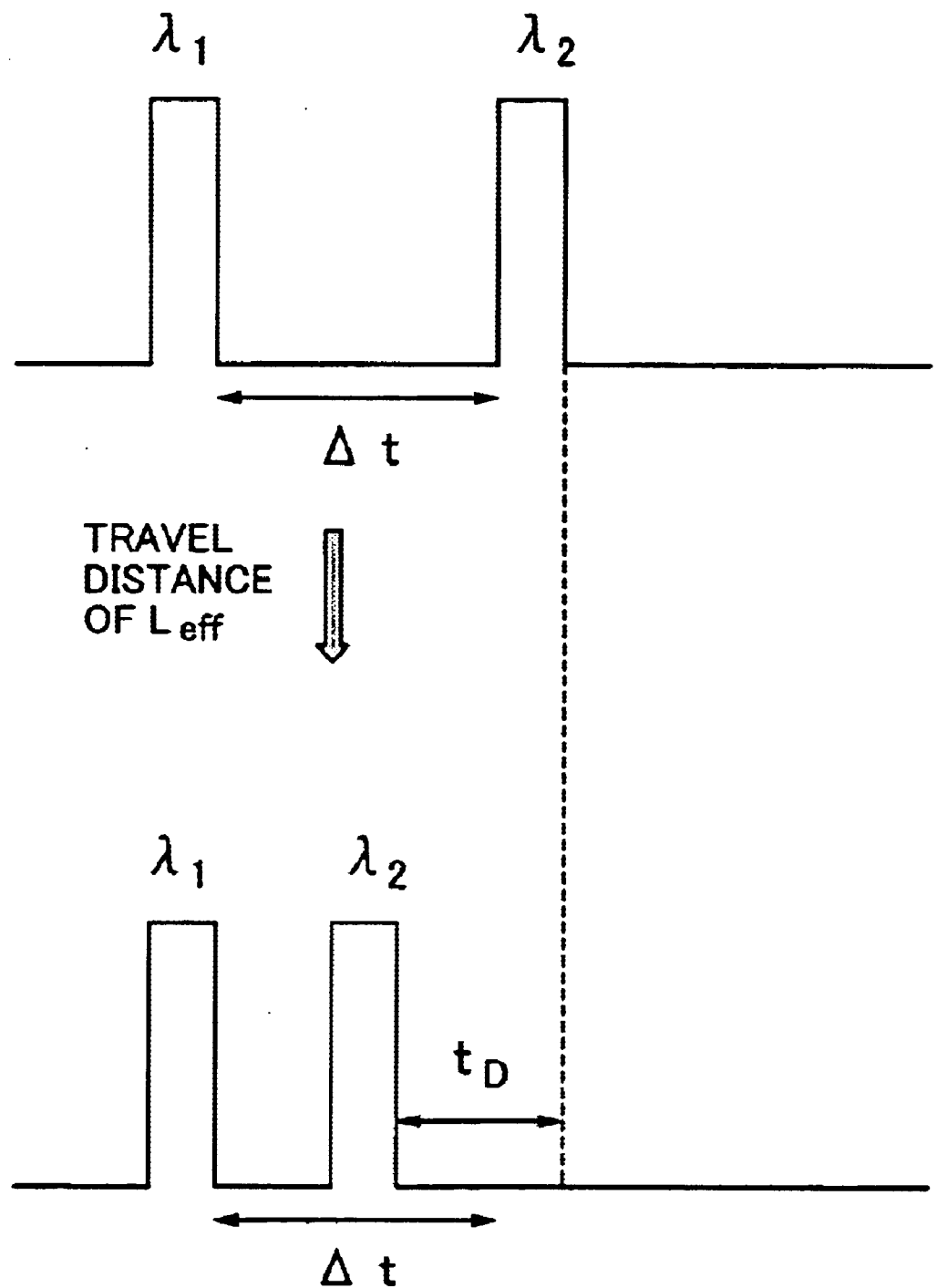
FIG. 7 is an explanatory diagram illustrating an initial interval $\Delta t$ between successive excitation light pulses having different wavelengths and an interval between the excitation light pulses after the pulses propagate through an optical fiber having an effective length $L_{\it eff}$.

FIG. 7 is an explanatory diagram illustrating an initial interval $\Delta t$ between successive excitation light pulses having different wavelengths and an interval between the pulses after the excitation light pulses propagate through an optical fiber having an effective length $L_{eff}$.

As illustrated in FIG. 7, when the initial interval $\Delta t$ between successive excitation light pulses having the different center wavelengths $\lambda_1$ and $\lambda_2$ is greater than the above delay $t_D$, it is possible to prevent interaction (such as the FWM) between the successive excitation light pulses having the different center wavelengths $\lambda_1$ and $\lambda_2$, and improve the quality of Raman amplified optical transmission.

The above condition for preventing interaction between the successive excitation light pulses having the different center wavelengths $\lambda_1$ and $\lambda_2$ can be expressed as follows.

$$(\lambda 1 - \lambda 2) \cdot D(\lambda 1) \cdot L_{eff} \leq \Delta t \tag{4}$$

In addition, the upper limit of the time interval $\Delta t$ between successively injected pulses is the relaxation time constant $\tau_\beta$ of phonons in the material of the optical fiber. That is, $$\Delta t \leq \tau_\beta \tag{5}$$

Further, the period T in which a series of n excitation light pulses having a plurality of different wavelengths (e.g., eight excitation light pulses having eight different wavelengths) is injected into the optical fiber transmission line F has the following relationships with the time interval $\Delta t$ and the effective length $L_{eff}$ of the optical fiber transmission line F.

$$\Delta t << T \leq 2\pi L_{eff}/c \tag{6}$$

For example, when the dispersion coefficient D at about 1,550 nm is 16.79 (ps/nm/km) and the effective propagation length is 100 km in a single mode optical fiber (SMF), the time interval $\Delta t$ between successively injected pulses can be determined as follows.

$$\Delta t = 1550 \text{ (nm)} \times 16.79 \text{ (ps/nm/km)} \times 100 \text{ (km)} \approx 2.6 \text{ } \mu\text{sec} \tag{7}$$

Therefore, for example, when the time interval $\Delta t$ between successively injected pulses is set to 3 microseconds, it is possible to avoid concurrent existence of more than one wavelength of excitation light at every location in the optical fiber transmission line F. Thus, the Raman amplification is not affected by the interaction between more than one wavelength of excitation light, and high-quality optical transmission can be realized.

(3) First Embodiment

A construction and operations of the first embodiment of the Raman amplification control apparatus according to the present invention are explained below.

Figure 8:
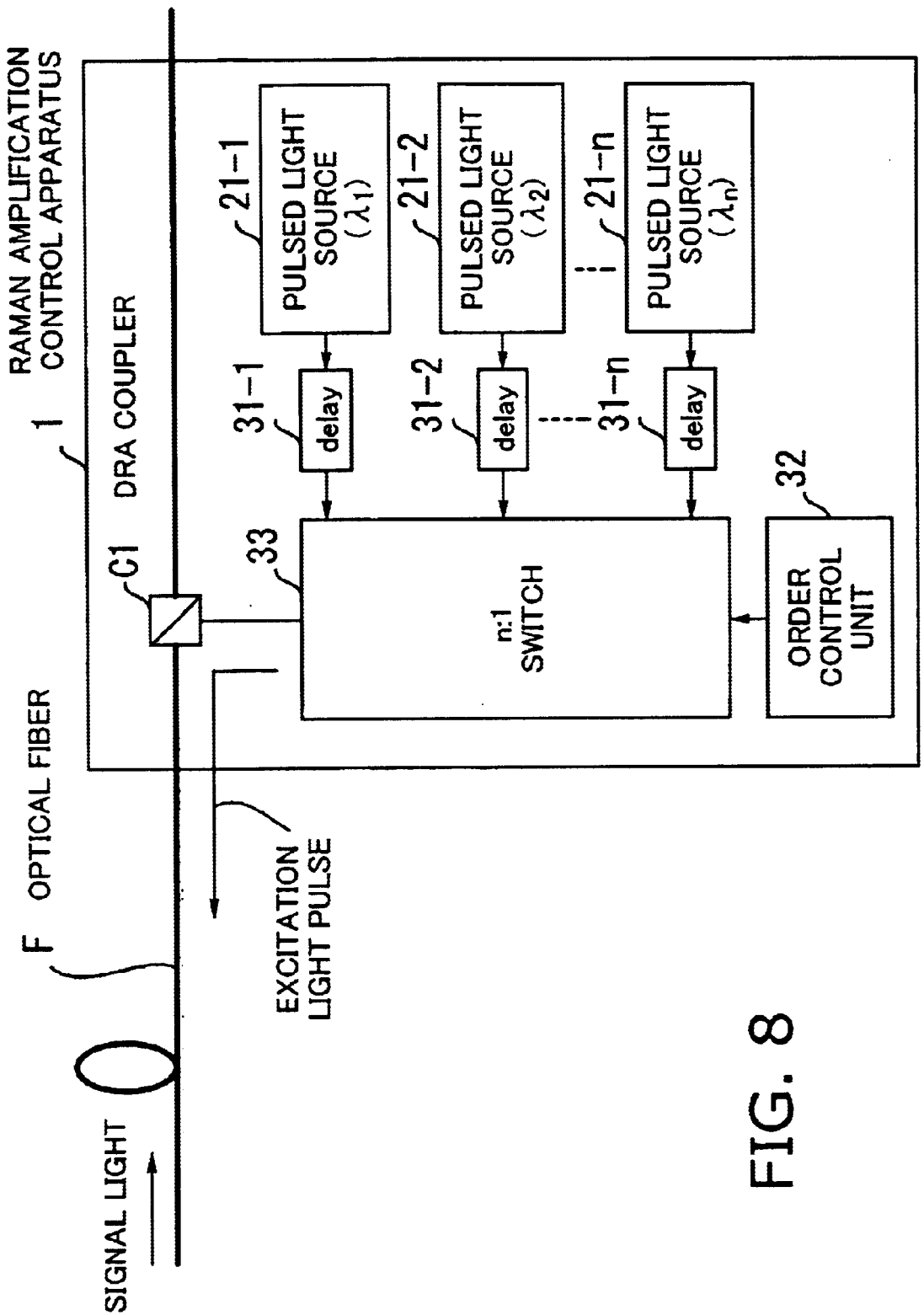
FIG. 8 is a diagram illustrating a construction of a first embodiment of the Raman amplification control apparatus.

FIG. 8 is a diagram illustrating a construction of the first embodiment of the Raman amplification control apparatus according to the present invention. The Raman amplification control apparatus of FIG. 8 corresponds to the Raman amplification control apparatus 1 illustrated in FIG. 3, and comprises pulsed light sources 21-1 to 21-$n$, delay units 31-1 to 31-$n$, an order control unit 32, an n:1 switch 33, and a DRA (distributed Raman amplifier) coupler C1. The pulsed light sources 21-1 to 21-$n$ constitute a pulsed light source unit 21, which corresponds to the pulsed excitation light generation unit 20 in FIG. 3. In addition, the delay units 31-1 to 31-$n$, the order control unit 32, the n:1 switch 33, and the DRA coupler C1 constitute the injection control unit 30 in FIG. 3.

The pulsed light sources 21-1 to 21-$n$ generate excitation light pulses respectively having wavelengths $\lambda_1, \lambda_2, \ldots \lambda_n$, where the excitation light pulses have high amplitudes and very small widths. The delay units 31-1 to 31-$n$ delay the excitation light pulses output from the pulsed light sources 21-1 to 21-$n$ so that the excitation light pulses having wavelengths $\lambda_1, \lambda_2, \ldots \lambda_n$ are spaced with constant time intervals. For example, the delay unit 31-1 delays the output of the pulsed light source 21-1 by $\Delta t$, the delay unit 31-2 delays the output of the pulsed light source 21-2 by $2\Delta t$, ... and the delay unit 31-$n$ delays the output of the pulsed light source 21-$n$ by $n\Delta t$.

The n:1 switch 33 receives the outputs from the delay units 31-1 to 31-$n$ at n input ports, and selects and outputs through an output port the outputs from the delay units 31-1 to 31-$n$ in turn under control of the order control unit 32, which controls the n:1 switch 33 so that the difference between each pair of excitation light pulses successively output from the n:1 switch 33 is minimized. The DRA coupler C1 optically couples the output of the n:1 switch 33 to the optical fiber transmission line F so that the excitation light pulses output from the n:1 switch 33 are injected into the optical fiber transmission line F. In the example of FIG. 8, the excitation light pulses are injected into the optical fiber transmission line F in the direction opposite to the direction of signal light transmitted through the optical fiber transmission line F, i.e., backward Raman excitation is realized.

Figure 9:
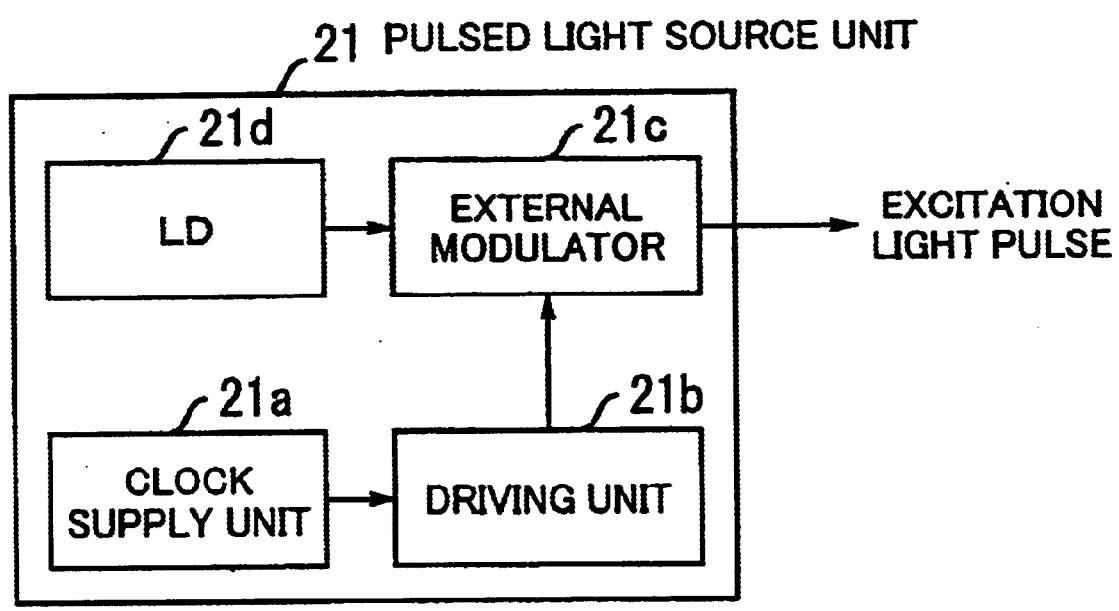
FIG. 9 is a diagram illustrating an example of each of the pulsed light sources 21-1 to 21-n.

FIG. 9 is a diagram illustrating an example of each of the pulsed light sources 21-1 to 21-$n$. The pulsed light source unit 21 of FIG. 9 comprises a clock supply unit 21$a$, a driving unit 21$b$, an external modulator 21$c$, and a laser diode (LD) 21$d$.

The clock supply unit 21$a$ supplies a clock pulse to the driving unit 21$b$. The driving unit 21$b$ receives the clock pulse from the clock supply unit 21$a$, generates an electric pulse signal corresponding to the received clock pulse, and outputs the electric pulse signal to the external modulator 21$c$. The laser diode (LD) 21$d$ in the pulsed light source 21-$i$ (i=1 to n) emits laser light having the wavelengths $\lambda_i$. The external modulator 21$c$ amplitude modulates the laser light emitted from the laser diode 21$d$, with the electric pulse signal output from the driving unit 21$b$, so as to generate an excitation light pulse having the wavelengths $\lambda_i$.

Figure 10:
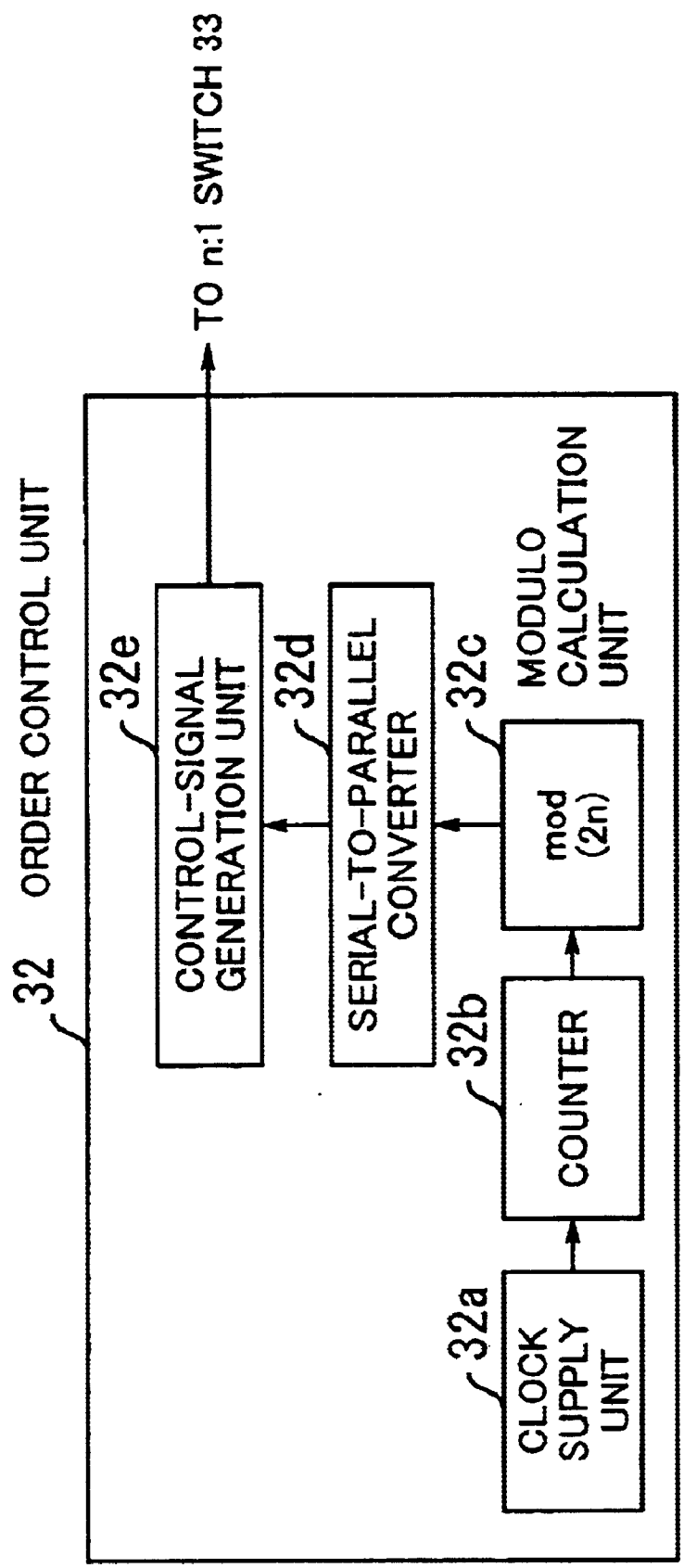
FIG. 10 is a diagram illustrating an example of the order control unit 32.

FIG. 10 is a diagram illustrating an example of the order control unit 32. The order control unit 32 comprises a clock supply unit 32$a$, a counter 32$b$, a modulo calculation unit 32$c$, a serial-to-parallel converter 32$d$, and a control-signal generation unit 32$e$.

The clock supply unit 32$a$ supplies clock pulses to the counter 32$b$. The counter 32$b$ counts the clock pulses supplied from the clock supply unit 32$a$, and sends the count to the modulo calculation unit 32$c$. The modulo calculation unit 32$c$ calculates the count modulo $2n$, where n is the number of the different wavelengths of excitation light, and outputs the residue $\delta$ of the modulo calculation to the serial-to-parallel converter 32$d$.

The serial-to-parallel converter 32$d$ converts the residue $\delta$ into a parallel form. The control-signal generation unit 32$e$ calculates $|\delta-n|$, and sends the calculated result to the n:1 switch 33.

For example, when the number n is eight, the residue $\delta$ modulo $2n$ can vary between 1 and 15, and the value $\delta-n$ can be an integer between $-7$ and 7. Therefore, when the count of the counter 32$b$ is incremented one by one, for example, the value $|\delta-8|$ varies as $0, 1, \ldots 6, 7, 6, \ldots 1, 0, 1, \ldots$ Thus, the value $|\delta-n|$ output from the order control unit 32 can be used as a control signal which controls the n:1 switch 33 so as to output the plurality of excitation light pulses having wavelengths $\lambda_1, \lambda_2, \ldots \lambda_n$ in the wavelength order, $\lambda_1, \lambda_2, \ldots \lambda_n, \lambda_{n-1} \ldots \lambda_2, \lambda_1, \lambda_2 \ldots$

(4) Second Embodiment

A construction and operations of the second embodiment of the Raman amplification control apparatus according to the present invention are explained below.

Figure 11:
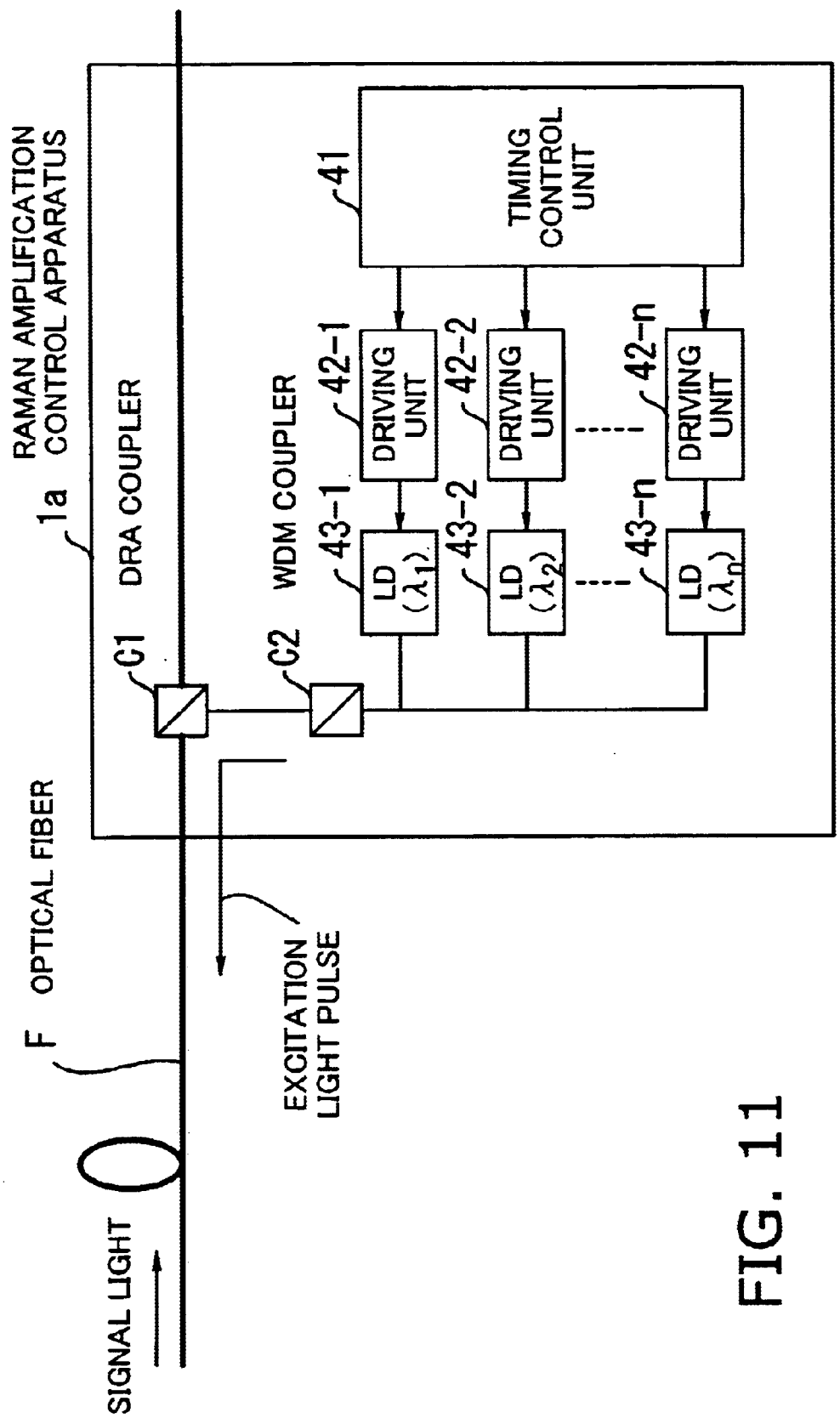
FIG. 11 is a diagram illustrating a construction of a second embodiment of the Raman amplification control apparatus.

FIG. 11 is a diagram illustrating a construction of the second embodiment of the Raman amplification control apparatus according to the present invention. The Raman amplification control apparatus 1$a$ of FIG. 11 comprises a timing control unit 41, driving units 42-1 to 42-$n$, laser diodes 43-1 to 43-$n$, a DRA coupler C1, and a WDM coupler C2.

The timing control unit 41 outputs a clock pulse to the driving units 42-1 to 42-$n$ in turn at regular time intervals $\Delta t$. For example, the timing control unit 41 outputs a first lock pulse to the driving unit 42-1 at time $\Delta t$, a second clock pulse to the driving unit 42-2 at time $2\Delta t$, ... and an nth clock pulse to the driving unit 42-$n$ at time $n\Delta t$. Preferably, the timing control unit 41 outputs clock pulses to the driving units 42-1 to 42-$n$ in turn at such timings that the plurality of excitation light pulses is having the n wavelengths $\lambda_1, \lambda_2, \ldots \lambda_n$ output from the Raman amplification control apparatus 1$a$ as illustrated in FIG. 4.

When each of the driving units 42-1 to 42-$n$ receives the clock pulse, the driving unit outputs a driving signal which drives one of the laser diodes 43-1 to 43-$n$ corresponding to the driving unit. When each of the laser diodes 43-1 to 43-$n$ receives a driving signal from one of the driving units 42-1 to 42-$n$ corresponding to the laser diode, the laser diode emits an excitation light pulse having one of the n wavelengths $\lambda_1, \lambda_2, \ldots \lambda_n$. That is, the laser diodes 43-1 to 43-$n$ emit excitation light pulses respectively having wavelengths $\lambda_1, \lambda_2, \ldots \lambda_n$ under control of the driving signals supplied from the driving units 42-1 to 42-$n$.

The WDM coupler C2 optically multiplexes the excitation light pulses having the n wavelengths emitted from the laser diodes 43-1 to 43-$n$, and outputs the multiplexed light to the DRA coupler C1. The DRA coupler C1 optically couples the multiplexed light to the optical fiber transmission line F so that the excitation light pulses output from the laser diodes 43-1 to 43-$n$ are injected into the optical fiber transmission line F.

(5) Third Embodiment

A construction and operations of the third embodiment of the Raman amplification control apparatus according to the present invention are explained below.

Figure 12:
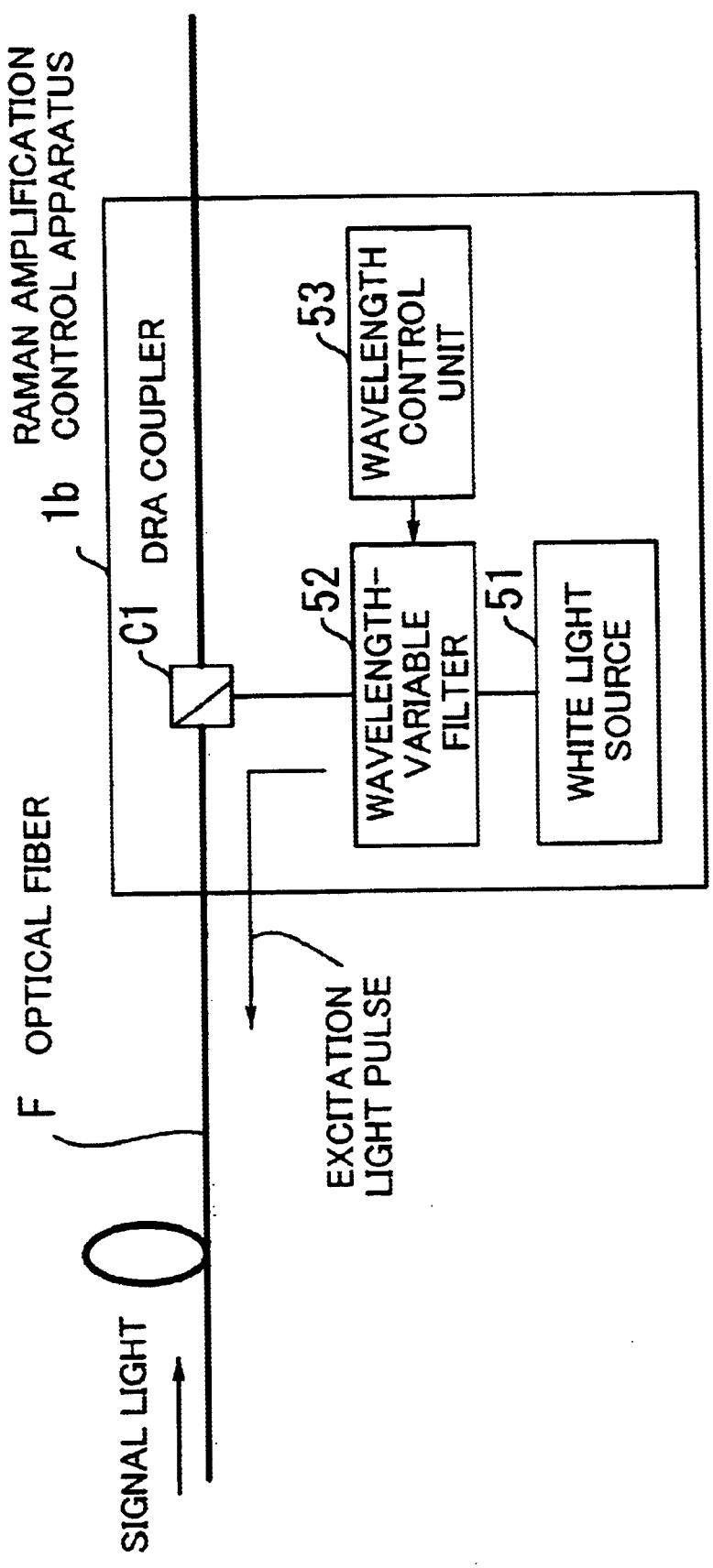
FIG. 12 is a diagram illustrating a construction of a third embodiment of the Raman amplification control apparatus.

FIG. 12 is a diagram illustrating a construction of the third embodiment of the Raman amplification control apparatus according to the present invention. The Raman amplification control apparatus 1b of FIG. 12 comprises a white light source 51, a wavelength-variable filter 52, a wavelength control unit 53, and a DRA coupler C1.

The white light source 51 emits white light, which is applied to the wavelength-variable filter 52. The transparent wavelength peak of the wavelength-variable filter 52 can be varied under control of the wavelength control unit 53. That is, the wavelength-variable filter 52 outputs only a portion of the white light having the transparent wavelength of the wavelength-variable filter 52. The wavelength control unit 53 controls the wavelength-variable filter 52 so that a plurality of (excitation) light pulses having the n wavelengths $\lambda_1, \lambda_2, \ldots \lambda_n$ is output in turn from the wavelength-variable filter 52 at predetermined time intervals, which are determined, for example, as explained before. The DRA coupler C1 injects the plurality of excitation light pulses output from the wavelength-variable filter 52 into the optical fiber transmission line F.

(6) Another Order of Injection

The wavelength dispersion, which occurs in optical transmission through an optical fiber, includes material dispersion and waveguide dispersion. That is, the wavelength dispersion can be expressed as a sum of material dispersion and waveguide dispersion.

In order to achieve optimum design, the dispersion of a wave can be minimized at a specific wavelength called zero-dispersion wavelength. For example, the currently available single-mode optical fibers for transmission of light having a wavelength of 1.3 micrometers are designed so that the material dispersion and waveguide dispersion cancel out, and the total wavelength dispersion becomes zero at the zero-dispersion wavelength. In the case of the LEAF (Large Effective Area Fiber), which is an optical fiber designed for the WDM transmission, the zero-dispersion wavelength is about 1,576 nm.

Therefore, when the plurality of excitation light pulses is injected into the optical fiber transmission line F in the order of the absolute value of the difference between each of the wavelengths of the plurality of excitation light pulses and the zero-dispersion wavelength, the difference between delays of each pair of successive excitation light pulses can be reduced, and therefore excitation light pulses having different wavelengths are less likely to overlap. Thus, it is possible to reduce the influence of the dispersion of the excitation light pulses.

Figure 13:
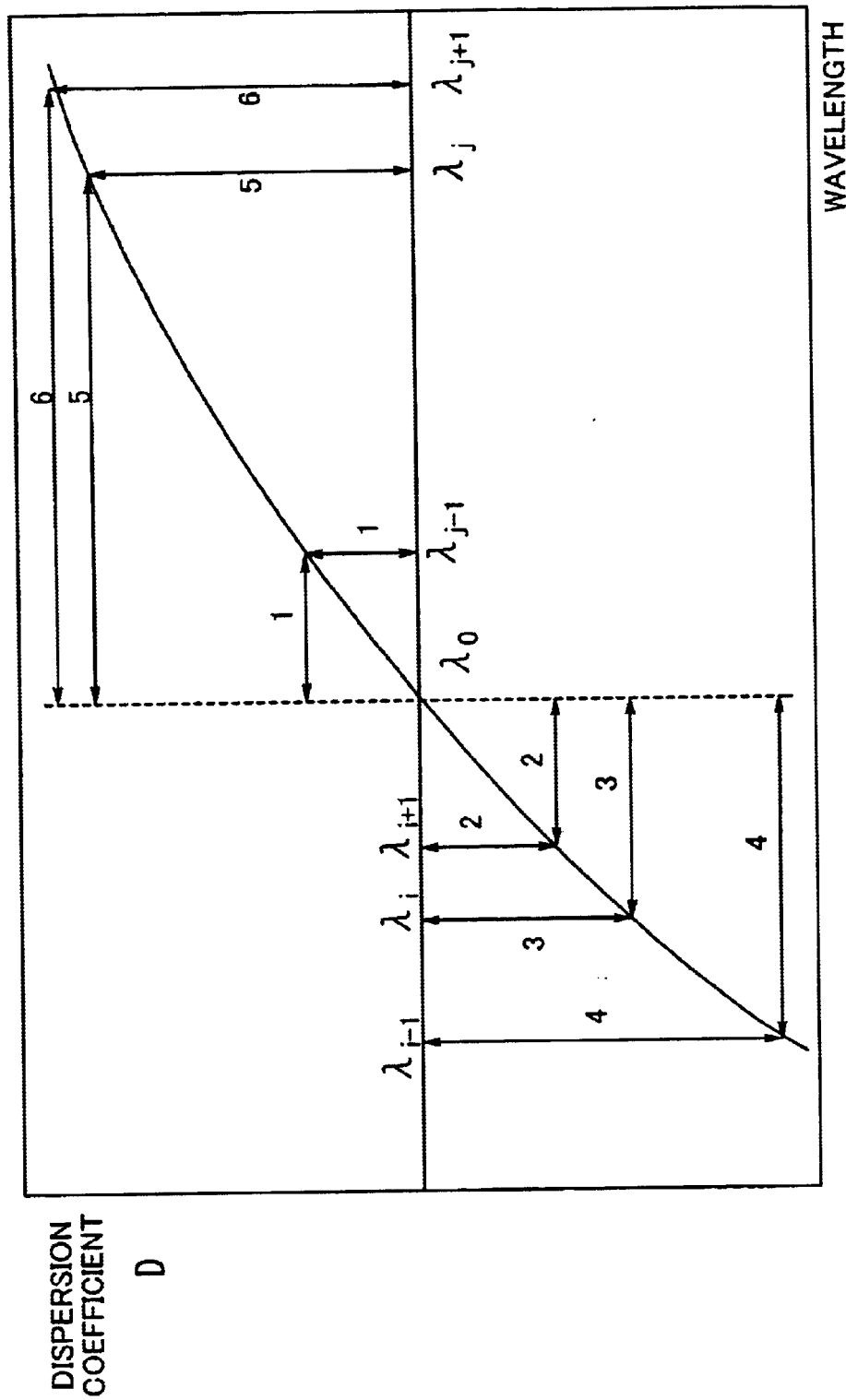
FIG. 13 is a graph indicating an example of a wavelength-dispersion characteristic of an optical fiber.

FIG. 13 is a graph indicating an example of a wavelength-dispersion characteristic of an optical fiber. In FIG. 13, the abscissa corresponds to the wavelength, and the ordinate corresponds to the dispersion coefficient D.

The wavelength dispersion of each wavelength of light is approximately determined by an absolute value of a difference between the wavelength of light and the zero-dispersion wavelength. Since the wavelength-dispersion characteristic curve can be approximated to be a linear function (odd function) passing through the zero-dispersion wavelength as an origin, the refractive index, which determines the delay of each excitation light pulse, can be approximated to be a quadratic function (even function) of the absolute value of the difference between the wavelength of light and the zero-dispersion wavelength. Therefore, the order of the absolute values of the differences between the wavelengths of light and the zero-dispersion wavelength approximately correspond to the order of the amounts of the refractive indexes. Since the propagation velocity of an excitation light pulse of each wavelength is determined by the refractive index at the wavelength, the amount of delay in the excitation light pulse is also determined by the refractive index at the wavelength. Consequently, the order of the absolute values of the differences between the wavelengths of the excitation light pulses and the zero-dispersion wavelength approximately correspond to the order of the amounts of delays in the excitation light pulses.

In the example of FIG. 13, the zero-dispersion wavelength $\lambda_0$ is between the minimum and maximum values of the n wavelengths of the n excitation light pulses as indicated by the inequalities (8), and the absolute values of the differences between the wavelengths of light and the zero-dispersion wavelength satisfy relationships expressed by the inequalities (9).

$$\lambda_1 < \lambda_2 < \ldots < \lambda_{i-1} < \lambda_i < \lambda_{i+1} < \ldots < \lambda_0 < \ldots \lambda_{j-1} < \lambda_j < \lambda_{j+1} < \ldots < \lambda_{n-1} < \lambda_n \quad (8)$$

$$|\lambda_{j-1}-\lambda_0| < |\lambda_{i+1}-\lambda_0| < |\lambda_i-\lambda_0| < |\lambda_{i-1}-\lambda_0| < |\lambda_j-\lambda_0| < |\lambda_{j+1}-\lambda_0| \quad (9)$$

Therefore, when the plurality of excitation light pulses is injected into the optical fiber transmission line F in the wavelength order, $\lambda_{j-1}, \lambda_{i+1}, \lambda_i, \lambda_{i-1}, \lambda_j, \lambda_{j+1}$, the influence of the difference in delays of each pair of successive excitation light pulses can be effectively suppressed. In FIG. 13, the order of injection of the excitation light pulses is indicated by the numbers 1 to 6.

FIG. 14 shows a table indicating the orders of injection of the excitation light pulses. That is, the plurality of excitation light pulses may be injected into the optical fiber transmission line F in either of the order, $\lambda_{j-1}, \lambda_{i+1}, \lambda_i, \lambda_{i-1}, \lambda_j, \lambda_{j+1}$ and the reverse order, $\lambda_{j+1}, \lambda_j, \lambda_{i-1}, \lambda_i, \lambda_{i+1}, \lambda_{j-1}$.

(7) Advantages and Other Matters (i) As explained above, when the Raman amplification control apparatuses as the first to third embodiments are used, it is possible to reduce the wavelength difference between successive excitation light pulses and avoid concurrent existence of more than one wavelength of excitation light at every location in the optical fiber transmission line F. Therefore, occurrence of nonlinear optical interaction (such as the SRS or FWM) between the successive excitation light pulses having the different wavelengths can be prevented. Thus, the power loss in the excitation light can be reduced, and the excitation efficiency and the quality of Raman amplified optical transmission can be improved.

(ii) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(iii) In addition, all of the contents of the Japanese patent application No.2001-307446 are incorporated into this specification by reference.

What is claimed is:

1. A Raman amplification control apparatus comprising:
a pulsed excitation light generation unit which generates a plurality of excitation light pulses having a plurality of different wavelengths; and
an excitation control unit which controls output of said plurality of excitation light pulses from said Raman amplification control apparatus so that the plurality of excitation light pulses is output from said Raman amplification control apparatus in turn at such timings that the plurality of excitation light pulses do not overlap even after propagation of a predetermined effective length of a predetermined optical transmission line.

2. The Raman amplification control apparatus according to claim 1, wherein said excitation control unit controls the output of the plurality of excitation light pulses from said Raman amplification control apparatus in such an order that a difference between propagation velocities of each pair of ones of the plurality of excitation light pulses successively output from the Raman amplification control apparatus is minimized.

3. The Raman amplification control apparatus according to claim 1, wherein said excitation control unit controls the output of the plurality of excitation light pulses from said Raman amplification control apparatus in such an order that a difference between wavelengths of each pair of ones of the plurality of excitation light pulses successively output from the Raman amplification control apparatus is minimized.

4. The Raman amplification control apparatus according to claim 3, wherein said excitation control unit controls the output of said plurality of excitation light pulses from said Raman amplification control apparatus in alternately increasing and decreasing order of wavelength.

5. The Raman amplification control apparatus according to claim 3, wherein said excitation control unit obtains an absolute value of a difference between a zero-dispersion wavelength of said predetermined optical transmission line and each of said plurality of different wavelengths, and controls the output of said plurality of excitation light pulses from said Raman amplification control apparatus in alternately increasing and decreasing order of the absolute value.

6. The Raman amplification control apparatus according to claim 1, wherein said excitation control unit controls the output of said plurality of excitation light pulses from said Raman amplification control apparatus so that each pair of ones of said plurality of excitation light pulses successively output from the Raman amplification control apparatus is spaced with an interval which is equal to or greater than a product of said effective length, a difference between wavelengths of said ones of said plurality of excitation light pulses, and a dispersion coefficient at one of the wavelengths of the ones of said plurality of excitation light pulses.

7. The Raman amplification control apparatus according to claim 1, wherein said excitation control unit comprises,
  a pulse light source which generates said plurality of excitation light puluses,
  a delay unit which delays the plurality of excitation light pulses generate by said pulse light source so that the plurality of excitation light pulses is spaced with constant time intervals,
  a switch which allows passage of the plurality of excitation light pulses in turn under control of a switch control unit after the plurality of excitation light pulses is delayed by the delay unit, and
  said switch control unit which controls said switch so that the switch allows passage of the plurality of excitation light pulses in such an order that the plurality of excitation light pulses does not overlap even after the propagation of the predetermined effective length of the predetermined optical transmission line.

8. The Raman amplification control apparatus according to claim 7, wherein said excitation control unit further comprises an optical coupler which optically couples said plurality of excitation light pulses output from said switch, to said predetermined optical transmission line so that the plurality of excitation light pulses is injected into the predetermined optical transmission line.

9. The Raman amplification control apparatus according to claim 1, wherein said excitation control unit comprises,
  a light source unit which emits said plurality of excitation light pulses in response to a plurality of driving signals, respectively,
  a timing control unit which outputs a plurality of clock pulses respectively corresponding to said plurality of excitation light pulses, at regular time intervals,
  a driving unit which outputs said plurality of driving signals in response to the plurality of clock pulses, respectively, and
  a first optical coupler which optically multiplexes the plurality of excitation light pulses emitted from the light source unit.

10. The Raman amplification control apparatus according to claim 9, wherein said excitation control unit further comprises a second optical coupler which optically couples said plurality of excitation light pulses output from said first optical coupler, to said predetermined optical transmission line so that the plurality of excitation light pulses is injected into the predetermined optical transmission line.

11. The Raman amplification control apparatus according to claim 1, wherein said excitation control unit comprises,
  a white light source which emits white light,
  a wavelength-variable filter which allows passage of only a variable portion of the white light having a variable transparent wavelength, and
  a wavelength control unit which controls the wavelength-variable filter so that said variable portion of the white light is varied in such a manner that said plurality of excitation light pulses is output from the wavelength-variable filter in turn.

12. The Raman amplification control apparatus according to claim 11, wherein said excitation control unit further comprises an optical coupler which optically couples said plurality of excitation light pulses output from said wavelength-variable filter, to said predetermined optical transmission line so that the plurality of excitation light pulses is injected into the predetermined optical transmission line.

13. A method for controlling Raman amplification, comprising the steps of:
  (a) generating a plurality of excitation light pulses having a plurality of different wavelengths; and
  (b) injecting said plurality of excitation light pulses into a predetermined optical transmission line in turn.

14. A method for controlling Raman amplification, comprising the steps of:
  (a) generating a plurality of excitation light pulses having a plurality of different wavelengths; and
  (b) injecting said plurality of excitation light pulses into a predetermined optical transmission line in turn at such timings that the plurality of excitation light pulses does not overlap even after propagation of a predetermined effective length of the predetermined optical transmission line.

15. The method according to claim 14, wherein, in step (b), the plurality of excitation light pulses is injected into the predetermined optical transmission line in such an order that a difference between propagation velocities of each pair of ones of the plurality of excitation light pulses successively injected into the predetermined optical transmission line is minimized.

16. The method according to claim 14, wherein, in step (b), the plurality of excitation light pulses is injected into the predetermined optical transmission line in such an order that a difference between wavelengths of each pair of ones of the plurality of excitation light pulses successively injected into the predetermined optical transmission line is minimized.

17. The method according to claim 16, wherein the plurality of excitation light pulses is injected into the predetermined optical transmission line in alternately increasing and decreasing order of wavelength.

18. The method according to claim 16, further comprising a step of obtaining an absolute value of a difference between a zero-dispersion wavelength of said predetermined optical transmission line and each of said plurality of different wavelengths, and in step (b), the plurality of excitation light pulses is injected into the predetermined optical transmission line in alternately increasing and decreasing order of the absolute value.

19. The method according to claim 14, wherein, in step (b), the plurality of excitation light pulses is injected into the predetermined optical transmission line at such timings that each pair of ones of said plurality of excitation light pulses successively injected into the predetermined optical transmission line is spaced with an interval which is equal to or greater than a product of said effective length, a difference between wavelengths of said ones of said plurality of excitation light pulses, and a dispersion coefficient at one of the wavelengths of the ones of said plurality of excitation light pulses.

* * * * *

UNITED STATES PATENT AND TRADEMARK OFFICE
CERTIFICATE OF CORRECTION

PATENT NO. : 6,844,961 B2
DATED : January 18, 2005
INVENTOR(S) : Kaori Odate et al.

It is certified that error appears in the above-identified patent and that said Letters Patent is hereby corrected as shown below:

Title page,
Item [57], ABSTRACT,
Line 1, change "an" to -- a --.
Line 2, delete "respectively".
Lines 3 and 4, change "are" to -- is --.
Line 6, change "do" to -- does --.
Lines 8-10, delete ". In addition, the plurality of excitation light pulses may be injected into the predetermined optical transmission line.".
Line 10, before "in" insert -- , or --.

Column 15,
Line 43, change "puluses" to -- pulses --.
Line 45, change "generate" to -- generated --.

Signed and Sealed this

Sixteenth Day of August, 2005

JON W. DUDAS
*Director of the United States Patent and Trademark Office*